United States Patent [19]

Moosberg

[11] Patent Number: 4,951,899
[45] Date of Patent: Aug. 28, 1990

[54] DUAL-TYPE GEAR UNIT FOR A MULTIPLIER REEL

[75] Inventor: Börje Moosberg, Mörrum, Sweden

[73] Assignee: Abu Garcia Produktion AB, Svangsta, Sweden

[21] Appl. No.: 368,514

[22] Filed: Jun. 20, 1989

[51] Int. Cl.$^5$ .......................................... A01K 89/015
[52] U.S. Cl. ..................................................... 242/255
[58] Field of Search ................................. 242/255, 264

[56] References Cited

U.S. PATENT DOCUMENTS

| | | | |
|---|---|---|---|
| 2,240,075 | 4/1941 | Kovalovsky | 242/255 |
| 2,417,732 | 3/1947 | Bland et al. | 242/255 |
| 3,167,272 | 1/1965 | Frode | 242/255 |
| 3,325,117 | 6/1967 | Hiromitsu | 242/264 |
| 3,600,964 | 8/1971 | Sarah | 242/255 |
| 4,566,655 | 1/1986 | Young | 242/255 |

*Primary Examiner*—Katherine A. Matecki
*Attorney, Agent, or Firm*—Browdy and Neimark

[57] ABSTRACT

A gear unit for a multiplier type fishing reel is arranged to drive the line spool of the fishing reel. The gear unit has a main shaft rotated by a handle. Two driving gears of different diameters are rotatably mounted on and frictionally coupled thereto by two sets of friction washers. The larger driving gear meshes with the gear drive of the line spool. Two adjusting knobs are provided for setting the frictional force exerted on the larger driving gear at a first value, and the frictional force exerted on the smaller driving gear at a second value exceeding the first value. Two driven gears of different diameter are rotatably mounted on a first spindle parallel to the main shaft and biased toward each other by a spring. The smaller driven gear meshes with the larger driving gear, and the larger driven gear meshes with the smaller driving gear. Cam surfaces are formed at the ends of the driven gears facing each other and are so designed that when the smaller driven gear rotates relative to the larger driven gears in one direction, they disengage the two driven gears from each other by urging them axially away from each other, and when the larger driven gear rotates relative to the smaller driven gear in this direction, they drivingly couple the two driven gears with each other.

6 Claims, 1 Drawing Sheet

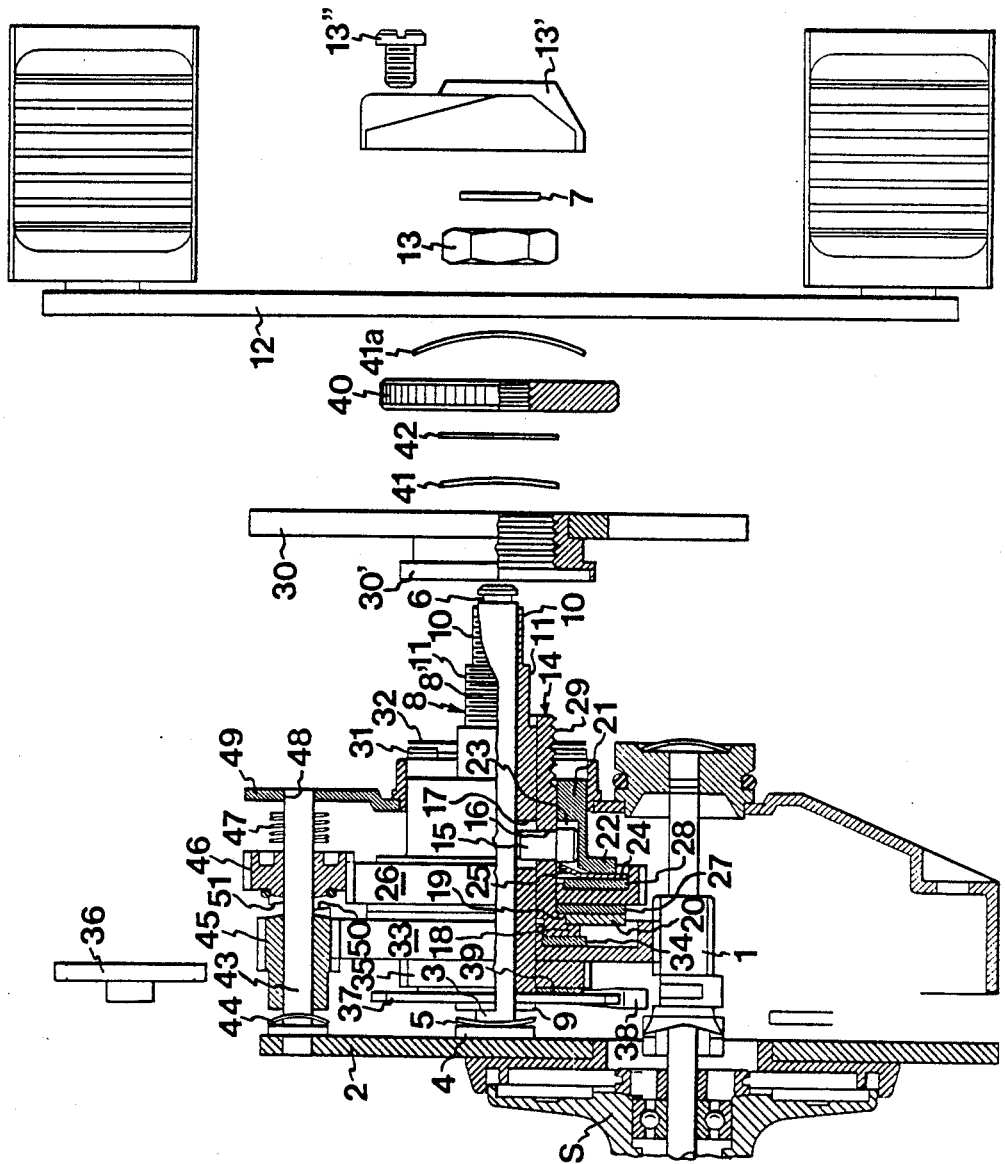

DUAL-TYPE GEAR UNIT FOR A MULTIPLIER REEL

TECHNICAL FIELD OF THE INVENTION

The present invention relates to a gear unit for a fishing reel of the multiplier type, which gear unit is adapted to drive the line spool of the fishing reel for retrieving a line fixed thereto, by engaging the gear drive of the line spool.

BACKGROUND OF THE INVENTION

A known goal unit of this kind used in a fishing reel of the multiplier type is provided for automatically changing the gear ratio between the drive shaft, provided with a handle, of the fishing reel and the line spool. This known gear unit, sometimes referred to as dual-type gear unit, has two driving gears of different diameter which are mounted on the drive shaft and each of which engages a gear drive on the shaft of the line spool in order to drive the line spool at different gear ratios. A plurality of friction washers provide a friction coupling between the drive shaft and the driving gears. The driving gears are rotatable relative to the drive shaft against the frictional force produced by the friction washers. This frictional force can be set for both driving gears by means of a common adjusting knob screwed on the drive shaft. The known gear unit is so adapted that the friction washers, for a given position of the adjusting knob, produce a smaller frictional force on the larger driving gear than on the smaller driving gear. When the resistance to line retrieve exerted on the line spool by the line and depending on the weight of the lure or the size and behavior of the fish is low, the line spool is driven by the larger driving gear, and the line is retrieved at a relatively high speed. When the resistance to line retrieve becomes so high that the frictional force exerted on the larger driving gear is overcome, the drive shaft will slip in relation to the larger driving wheel, the line spool being driven by the smaller driving gear, such that the line is retrieved at a lower speed. When the resistance to line retrieve becomes so high that also the frictional force exerted on the smaller driving gear is overcome, the line spool will not be driven at all since, in such a case, the drive shaft will be slipping in relation to the two driving gears.

The frictional force exerted on the two driving gears by the friction washers is set by means of the adjusting knob depending on the type of lure used and/or depending on the type of fishing. One drawback of the dual-type gear unit described above is that the adjusting knob is common to all the friction washers and, thus, to both driving gears, which means that the frictional force exerted on one driving gear cannot be set independently of the frictional force exerted on the other driving gear. Therefore, a change of the frictional force exerted on one driving gear entails a corresponding change of the frictional force exerted on the other driving gear.

BRIEF ACCOUNT OF THE INVENTIVE CONCEPT

One object of the present invention therefore is to provide a dual-type gear unit in which the abovementioned drawback is overcome and in which the frictional force exerted on one driving gear and the frictional force exerted on the other driving gear thus can be set independently of each other.

According to the present invention, this object is achieved by means of a gear unit for a fishing reel of the multiplier type, which gear unit is adapted to drive the line spool of the fishing reel for retrieving a line fixed thereto, by engaging the gear drive of the line spool, said unit comprising a mounting plate;

a main shaft mounted on said mounting plate;

a handle for rotating said main shaft;

a first driving gear rotatably mounted on said main shaft and meshing with the gear drive of the line spool;

first friction means providing a friction coupling between said main shaft and said first driving gear;

first setting means for setting the frictional force of said first friction means at a first value;

a second driving gear having a smaller diameter than said first driving gear and rotatably mounted on said main shaft;

second friction means providing a friction coupling between said main shaft and said second driving gear;

second setting means for setting the frictional force of said second friction means at a second value which is higher than said first value;

a first spindle fixed to said mounting plate and extending parallel to said main shaft;

two driven gears of different diameter which are rotatably mounted on said first spindle and the smaller of which meshes with said first larger driving gear and the larger of which meshes with said second smaller driving gear; and coupling means which is adapted in a first case when the two driven gears, by the rotation of the driving gears in a direction corresponding to the direction of line retrieve, are rotated in one direction and the smaller driven gear then is rotated at a higher speed than the larger driven gear, to disengage the two driven gears from each other, and in a second case when the larger driven gear, by the rotation of the smaller driving gear in the direction corresponding to the direction of line retrieve, is rotated in said one direction and the larger driving gear is not driven by the main shaft because the gear drive of the spool produces a braking effect exceeding the frictional force, set at said first value, of said first friction means, to couple said two driven gears with each other, such that the larger driven gear entrains the smaller driven smaller gear, in turn driving the larger driving gear.

The coupling means preferably comprises spring means axially urging said driven gears towards each other, and cam means provided on the end surfaces of said driven gears facing each other, and being so designed that in said first case, they urge said driven gears axially away from each other against the action of said spring means, and in said second case, they engage each other for coupling said driven gears with each other.

In a preferred embodiment, the main shaft comprises an outer sleeve on which said second smaller driving gear is mounted, and an inner sleeve which is non-rotatably connected to the outer sleeve and extends through said outer sleeve and on which said first larger driving gear is mounted, said inner sleeve being rotatably mounted on a second spindle fixed to said mounting plate and extending through said inner sleeve.

In this preferred embodiment, the outer sleeve suitably has a radial annular flange at one end thereof, an abutment is non-rotatably connected to said inner sleeve at one end thereof, said first friction means comprises friction washers disposed on each side of said first larger driving gear, between this gear and said flange, on the one hand, and this gear and said abutment, on the other hand, and wherein said first setting mean comprises an adjusting knob screwed on said inner sleeve at the other end thereof so as to engage the other end of said outer sleeve.

Further, the outer sleeve suitably has a pressure member non-rotatably but axially displaceably mounted thereon, s id second friction means comprises friction washers disposed on each side of said second smaller driving gear, between this gear and said pressure member, on the one hand, and this gear and said annular flange, on the other hand, and wherein said second setting means comprises an adjusting knob screwed on said outer sleeve at said other end thereof so as to engage said pressure member.

BRIEF DESCRIPTION OF THE ACCOMPANYING DRAWING

The invention will now be described in more detail with reference to the accompanying drawing which is an exploded view partly in longitudinal section schematically showing a preferred embodiment of a gear unit according to the present invention.

DETAILED DESCRIPTION OF THE INVENTION

The gear unit shown in the drawing is intended for a fishing reel of the multiplier type and is adapted to drive the line spool S of the fishing reel by engaging the gear drive 1 of the line spool.

The gear unit has a mounting plate 2 with a fixed spindle 3 projecting at right angles therefrom. The spindle 3 has a base 4 against which a spring washer 5 mounted on the spindle bears. At its outer end (the right-hand end in the drawing), the spindle 3 has a circumferential groove 6 for a retainer washer 7. An inner sleeve 8 whose inner diameter is equal to the outer diameter of the spindle 3 is rotatably mounted on the spindle. At its inner end (i.e. the left-hand end in the drawing), the inner sleeve 8 has a radial annular flange 9 bearing on the base 4 via the spring washer 5. The outer end of the inner sleeve 8 has a threaded portion 8' which closest to the outer end of the inner sleeve has two diametrically opposed planar surfaces 10 forming a so-called flat extending into a mating hole in a handle 12 for non rotatably carrying the handle. Inwardly of the planar surfaces 10, the threaded portion 8' has two further diametrically opposed planar surfaces 11, also forming a so-called flat.

The handle 12 is retained on the inner sleeve 8 by a nut 13 screwed on the threaded portion 8', and the inner sleeve 8 is retained on the spindle 3 by the retainer washer 7 engaging in the circumferential groove 6 of the spindle. The nut 13 and the retainer washer 7 are covered by a cap 13' fixed to the handle 12 by a screw 13".

An outer sleeve 14 whose inner diameter is equal to the outer diameter of the inner sleeve 8 is mounted on the inner sleeve 8 and non-rotatably connected to it by means of a pin 15 extending through a radial hole 16 in the outer sleeve 14 into a radial hole 17 in the inner sleeve 8. The hole 16 in the outer sleeve 14 has the same diameter as the pin 15. The hole 17 in the inner sleeve 8 is elongate in the axial direction, its width being equal to the diameter of the pin 15. The outer sleeve 14 thus is non rotatably but slightly axially displaceably connected to the inner sleeve 8.

At its inner end, the outer sleeve 14 has a radial annular first flange 18 and, to the right (with respect to the drawing) of this flange, a radial annular second flange 19 having a smaller diameter than the first flange 18. The second flange 19 has two diametrically opposed planar surfaces forming a so-called flat, and carries a support washer 20 in a non-rotatable fashion relative to the outer sleeve 14.

The outer sleeve 14 carries a pressure sleeve 21 of plastic, whose inner diameter is equal to the outer diameter of the outer sleeve 14 and which at its inner end has a radial annular flange 22. The sleeve 21 has an internal axial groove 23 for receiving the radially outer end of the pin 15. The groove 23 is so dimensioned that the pressure sleeve 21 is non-rotatably, but slightly axially displaceably connected to the outer sleeve 14. A slip washer 24 of brass is non rotatably connected to the pressure sleeve 21 and, to this end, has an axially punched tongue 25 engaging in a recess in the flange 22.

The outer sleeve 14 rotatably supports a driving gear 26. Two friction washers 27 and 28 of leather, which are rotatable relative to the outer sleeve 14, are arranged on each side of the driving gear 26. The friction washer 27 bears on both the support washer 20 and the driving gear 26, and the friction washer 28 bears on both the slip washer 24 and the driving gear 26. The friction washers 27 and 28 thus form a friction coupling between the washers 20 and 24 non-rotatably connected to the outer sleeve 14 and the driving gear 26 and, hence, between the shaft formed by the non-rotatably interconnected sleeves 8 and 14 and rotatable by means of the handle 12, and the driving gear 26.

The outer end of the outer sleeve 14 has a threaded portion 29. A knob 30 for setting the frictional force exerted on the driving gear 26 by the friction washers 27 and 28 is screwed on the threaded portion 29. The knob 30 has a hub portion 30' which, via a spring washer 31 and a support washer 32, bears on the outer end of the pressure sleeve 21 in order, by rotation of the knob 30, to permit adjusting the force with which the support washer 20, the friction washer 27, the driving gear 26, the friction washer 28 and the slip washer 24 are pressed together between the flange 18 and the pressure sleeve 21, i.e. to adjust the above-mentioned frictional force.

The inner sleeve 8 rotatably carries a driving gear 33 having a larger diameter than the driving gear 26 and disposed inwardly thereof. The driving gear 33 engages the gear drive 1 of the line spool. The driving gear 33 bears on the flange 18 of the outer sleeve 14 by the intermediary of a friction washer 34 of leather which is rotatable with respect to the inner sleeve 8. A gear 35 is non rotatably connected to the driving gear 33 by means of axial pins (not shown) and meshes with a gear 36 for driving the level-wind mechanism (not shown) of the fishing reel.

To the right (with respect to the drawing) of the flange 9, the inner sleeve 8 has a further radial annular flange (not shown) which has a smaller diameter than the flange 9 and is designed with two diametrically opposed planar surfaces forming a so called flat and supporting a combined anti-reverse and slip washer 37 in a non rotatable fashion relative to the inner sleeve 8. The washer 37, engaging an anti reverse pawl 38, forms a stop together with the flange 9.

A friction washer 39 of leather, which is rotatable relative to the inner sleeve 8, is disposed between the gear 35 non-rotatably connected to the driving gear 33, and the washer 37 and bears on these two components.

The friction washers 34 and 39 thus form a friction coupling between the parts 18 and 37 non-rotatably connected to the inner sleeve 8, i.e. the flange 18 of the outer sleeve 14 and the anti-reverse and slip washer 37, and the driving gear 33 and, hence, between the shaft formed by the two non-rotatably interconnected sleeves 8 and 14 and rotatable by means of the handle 12, and the driving gear 33.

A knob 40 for setting the frictional force exerted on the driving gear 33 by the friction washers 34 and 39 is screwed on the threaded portion 8' of the inner sleeve 8. The knob 40 bears on the outer end of the outer sleeve 14 by the intermediary of a spring washer 41, which is non-rotatably mounted on the flat 11, and a support washer 42. A spring washer 41a is disposed between the knob 40 and the handle 12. By turning the knob 40, it is possible to adjust the force with which the friction washer 39, the gear 35, the driving gear 33 and the friction washer 34 are pressed together between the anti-reverse and slip washer 37 and the flange 18, that is the above-mentioned frictional force is adjusted.

The mounting plate 2 has a spindle 43 projecting therefrom parallel to the spindle 3 and carrying a spring washer 44, a first driven gear 45, a second driven gear 46 having a larger diameter than the first driven gear 45, and a spring 47 urging the gears 45 and 46 axially towards each other. The spindle 43 extends into a hole 48 in a protective cover 49. The larger driven gear 46 meshes with the smaller driving gear 26, and the smaller driven gear 45 meshes with the larger driving gear 33. The spring 47 is part of coupling means which also comprises cam surfaces 50, 51 provided at the ends of the driven gears 45 and 46 facing each other.

The frictional force exerted on the driving gear 33 by the friction washers 34 and 39 is set by means of the knob 40 at a first value, for instance depending on the weight of the lure. This first value determines the resistance to line retrieve, exerted on the line spool S by the line, at which the gear ratio of the gear unit is reduced.

The frictional force exerted on the driving gear 26 by the friction washers 27 and 28 is set by means of the knob 30 at a second value depending on the type of fishing and on the strength of the fishing line. This second value, which is higher than the above-mentioned first value, thus determines the resistance to line retrieve, exerted on the line spool S by the line, at which the gear unit starts slipping and, thus, ceases to drive the line spool.

The cam surfaces 50 and 51 are so designed that in a first case when the two driven gears 45 and 46 upon rotation of the handle 12 and, thus, of the shaft 8, 14 and the driving gears 26 and 33 in a direction corresponding to tho direction of retrieve of the line spool, are rotated in one direction and the smaller driven gear 45 then is rotated at a higher speed than the larger driven gear 46, these cam surfaces disengage the two driven gears with respect to each other by urging them axially away from each other against the action of the spring 47, and in a second case when the larger driven gear 46 upon rotation of the handle 12 and, thus, of the shaft 8, 14 and the smaller driving gear 26 in the direction corresponding to the direction of retrieve, is rotated in said one direction and the larger driving gear 33 is not driven by the shaft 8, 14 because the gear drive 1 of the line spool produces a braking effect exceeding the frictional force of the friction washers 34 and 39 set at said first value, these cam surfaces couple the two driven gears 45 and 46 with each other, such that the larger driven gear 46 entrains the smaller driven gear 45, in turn driving the larger driving gear 33 for driving the gear drive 1 of the line spool.

In this regard, when a sufficiently high resistance to line retrieve is produced, for instance by a fish pulling hard on the line, the gear drive 1 of the line spool becomes so stiff to rotation that the frictional action of the first friction means 34, 39 on the first driving gear 33, meshing with the gear drive 1 of the line spool for driving it, will not be sufficient for producing this driving. The gear drive 1 of the line spool thus produces a braking effect exceeding the frictional action of the first friction means. The driving gear 33 would thus be completely stationary should it not instead be driven via the driving gear 26, the gear 46, the coupling means 50, 51, and the gear 45. If the resistance to line retrieve is further increased and becomes so substantial that the drive of the line spool produces such a braking effect that the frictional action also of the second friction means is overcome, the entire "package" will slip, i.e. the driving gear 33 will be completely stationary.

What I claim and desire to secure by Letters Patent is:

1. A gear unit for a fishing reel of the multiplier type having a mounting plate, a first spindle mounted on said mounting plate, a line spool and a line spool gear drive which are mounted on said first spindle, which gear unit is adapted to drive the line spool of the fishing reel for retrieving a line fixed thereto, by engaging the gear drive of the line spool, said unit comprising a main shaft mounted on said mounting plate and extending parallel to said first spindle;

a handle for rotating said main shaft;

a first driving gear rotatably mounted on said main shaft and meshing with the gear drive of the line spool;

first friction means providing a friction coupling between said main shaft and said first driving gear;

first setting means for setting the frictional force of said first friction means at a first value;

a second driving gear having a smaller diameter than said first driving gear and rotatably mounted on said main shaft;

second friction means providing a friction coupling between said main shaft and said second driving gear;

second setting means for setting the frictional force of said second friction means at a second value which is higher than said first value;

a second spindle fixed to said mounting plate and extending parallel to said main shaft;

two driven gears of different diameter which are rotatably mounted on said second spindle and the smaller of which meshes with said first larger driving gear and the larger of which meshes with said second smaller driving gear; and coupling means which is adapted in a first case when the two driven gears, by the rotation of the driving gears in a direction corresponding to the direction of line retrieve, are rotated in one direction and the smaller driven gear then is rotated at a higher speed than the larger driven gear, to disengage the two driven gears from each other, and in a second case when the larger driven gear, by the rotation of the smaller driving gear in the direction corresponding to the direction of line retrieve, is rotated in said one direction and the larger driving gear is not driven by the main shaft because the gear drive of the spool produces a braking effect exceeding the frictional force, set at said first value, of said first friction means, to couple said two driven gears with each other, such that the larger driven gear entrains the smaller driven gear, in turn driving the larger driving gear.

2. Gear unit as claimed in claim 1, wherein said coupling means comprises spring means axially urging said driven gears towards each other, and cam means provided on the end surfaces of said driven gears facing each other, and being so designed that in said first case, they urge said driven gears axially away from each other against the action of said spring means, and in said second case, they engage each other for coupling said driven gears with each other.

3. Gear unit as claimed in claim 1, wherein said main shaft comprises an outer sleeve on which said second smaller driving gear is mounted, and an inner sleeve which is non-rotatably connected to the outer sleeve and extends through said outer sleeve and on which said first larger driving gear is mounted, said inner sleeve being rotatably mounted on a third spindle fixed to said mounting plate and extending through said inner sleeve.

4. Gear unit as claimed in claim 3, wherein said outer sleeve has a radial annular flange at one end thereof, an abutment is non-rotatably connected to said inner sleeve at one end thereof, said first friction means comprises friction washers disposed on each side of said first larger driving gear, between this gear and said flange, on the one hand, and this gear and said abutment, on the other hand, and wherein said first setting means comprises an adjusting knob screwed on said inner sleeve at the other end thereof so as to engage the other end of said outer sleeve.

5. Gear unit as claimed in claim 4, wherein said outer sleeve has a pressure member non-rotatably but axially displaceably mounted thereon, said second friction means comprises friction washers disposed on each side of said second smaller driving gear, between this gear and said pressure member, on the one hand, and this gear and said annular flange, on the other hand, and wherein said second setting means comprises an adjusting knob screwed on said outer sleeve at said other end thereof so as to engage said pressure member.

6. A gear unit as claimed in claim 1, wherein said line spool gear drive is adapted for movement in an axial direction in relation to said first spindle to disengage from meshing with said first driving gear.

* * * * *